United States Patent [19]

Dromard et al.

[11] Patent Number: 5,234,493
[45] Date of Patent: Aug. 10, 1993

[54] STABLE, PUMPABLE AQUEOUS SUSPENSIONS OF PRECIPITATED SILICA PARTICULATES

[75] Inventors: Adrien Dromard, Asnieres; Claude Richard, Lyons, both of France

[73] Assignee: Rhone-Poulenc Chimie, Courbevoie, France

[21] Appl. No.: 873,891

[22] Filed: Apr. 24, 1992

Related U.S. Application Data

[63] Continuation of Ser. No. 433,267, Nov. 8, 1989, abandoned.

[30] Foreign Application Priority Data

Nov. 8, 1988 [FR] France ................................ 88 14565

[51] Int. Cl.$^5$ ............................................... C08L 5/00
[52] U.S. Cl. ................................. 106/208; 106/209; 106/483; 106/491; 501/154
[58] Field of Search ............... 106/208, 209, 483, 491; 501/154

[56] References Cited

U.S. PATENT DOCUMENTS

| | | | |
|---|---|---|---|
| 3,428,464 | 2/1969 | Pollard | 106/209 |
| 3,455,705 | 7/1969 | Rusher | 106/209 |
| 3,821,008 | 6/1974 | Jordan et al. | 106/209 |
| 4,260,396 | 4/1981 | Glemza | 51/293 |
| 4,519,844 | 5/1985 | Chaux et al. | 106/209 |
| 4,735,659 | 4/1988 | Bishop | 106/209 |

FOREIGN PATENT DOCUMENTS

| | | | |
|---|---|---|---|
| 194116 | 9/1986 | European Pat. Off. | |
| 0332513 | 9/1989 | European Pat. Off. | 106/209 |
| 2414387 | 8/1979 | France | |

OTHER PUBLICATIONS

Hawley, *Condensed Chemical Dictionary*, Van Nostrand Reinhold Co., 1974, p. 840 (no month available).

*Primary Examiner*—David Brunsman
*Attorney, Agent, or Firm*—Burns, Doane, Swecker & Mathis

[57] ABSTRACT

Stable, non-gelling and pumpable aqueous suspensions of precipitated silica particulates, well adapted for the coating of paper and cardboard substrates, include an effective stabilizing amount of at least one biogum heteropolysaccharide and at least one quaternary ammonium, sulfonium or phosphonium compound (cationic surfactant).

30 Claims, No Drawings

STABLE, PUMPABLE AQUEOUS SUSPENSIONS OF PRECIPITATED SILICA PARTICULATES

This application is a continuation of application Ser. No. 07/433,267, filed Nov. 8, 1989, now abandoned.

BACKGROUND OF THE INVENTION

1. Field of the Invention

The present invention relates to novel stable aqueous suspensions of precipitated silica particulates and to the use of such novel suspensions, particularly in the papermaking industry.

2. Description of the Prior Art

Aqueous slurries or suspensions of silicas are known to this art to be useful for a number of different applications, in particular in the papermaking industry, for the coating of various paper substrates.

Nonetheless, these suspensions have a tendency to suffer from gelling or sedimentation, which makes them difficult to transport or store. Indeed, it very frequently occurs that the formation of a gel or the deposit of a hard layer of pigment, above which a slurry forms which is more fluid but which has a low content of dry solids, is observed at the end of a transportation operation or after storage over a period of time of greater or lesser duration. In addition, it is often impossible to resuspend the silica or to produce a slurry which has a sufficiently low viscosity that it can be pumped and therefore used on an industrial scale. Thus, a pronounced problem exists in this art, which becomes all the more acute when attempts are made to produce suspensions having a high content of dry solids.

French Patent Application No. 2,414,387 and European Patent Application No. 194,116 describe processes for the stabilization of silica slurries using xanthan gum or a quaternary ammonium compound. However, such applications essentially relate to slurries of silica gel, the precipitated silica-base suspensions which are stabilized by the described processes not exceeding a level of concentration on the order of 10%.

SUMMARY OF THE INVENTION

Accordingly, a major object of the present invention is the provision of novel suspensions of silica which are stable, non-gelling, pumpable and dispersible after several days of storage, while at the same time being quite concentrated.

Briefly, the stable aqueous suspensions of silica according to the present invention comprise a precipitated silica, a biogum, and a cationic surface active agent selected from among quaternary ammonium compounds and sulfonium or phosphonium compounds.

DETAILED DESCRIPTION OF THE PREFERRED EMBODIMENTS OF THE INVENTION

More particularly according to the present invention, it has now unexpectedly been found that, after a long period of storage ranging from several days to several months, the subject suspensions suffered from little or no sedimentation and in all cases retained a suitable viscosity.

The suspensions according to the invention are based essentially on precipitated silica. By "precipitated silica" is intended any silica produced by reaction of a silicate with an acid. The particular technique for preparing the silica may be any known means (addition of an acid to a bottoms fraction of silicate, simultaneous total or partial addition of acid and silicate to a bottoms fraction of water or silicate solution, etc.) and it will be selected depending upon the type of silicate sought to be prepared and, therefore, the particular end use intended for any given suspension. A distinction is made between precipitated silicas which constitute the suspensions of the invention, and gels, in accordance with the usual known criteria, namely, essentially the criteria that precipitated silicas have a highly dispersed pore distribution as a result of a discontinuous structure, whereas, in contrast, gels are of a continuous three-dimensional structure. Precipitated silicas are generally precipitated at a pH around a neutral or basic pH-value, while gels are prepared at a pH which is typically acid or strongly acid.

For example, according to the present invention it is possible to use silicas which, once dried, have a BET surface area in accordance with the standard NFX 11-622 (3.3) which is generally at most 400 m$^2$/g and preferably ranges from 2 to 400 m$^2$/g and more preferably ranges from 50 to 250 m$^2$/g. The silicas may also exhibit degrees of oil absorption, in accordance with the standard NFT 30-022 (March '53), using dioctyl phthalate, that can range from 50 to 400 cm$^3$/100 g.

The silica suspensions according to this invention may be produced by placing a previously prepared silica which has optionally been dried, into suspension in water.

In a particular alternative embodiment of the invention, a starting suspension of silica can also be used which constitutes the filter cake resulting from the precipitation reaction.

Stated differently, the procedure comprises effecting precipitation of the silica, filtering the reaction medium and obtaining a filter cake which is washed, if necessary. The cake is then slaked and a suspension is thus formed.

Such suspensions are stabilized according to the invention by the system which will now be described in detail.

This system is based first on a biogum. Biogums are heteropolysaccharides of high molecular weight which is generally greater than one million, these being prepared by fermentation of a carbohydrate under the action of a microorganism.

Exemplary of the biogums which can be used in the suspensions of the present invention, particularly representative are those which are produced by fermentation under the action of bacteria or fungi belonging to the genus Xanthomonas, such as *Xanthomonas begoniae, Xanthomonas campestris, Xanthomonas carotae, Xanthomonas hederae, Xanthomonas incanae, Xanthomonas malvacearum, Xanthomonas papavericola, Xanthomonas phaseoli, Xanthomonas pisi, Xanthomonas vasculorum, Xanthomonas vesicatoria, Xanthomonas vitians* and *Xanthomonas pelargonii;* the genus Arthrobacter and more particularly the species *Arthrobacter stabilis* and *Arthrobacter viscosus;* the genus Erwinia: the genus Azotobacter and more particularly the species *Azobacter indicus;* the genus Agrobacter and more particularly the species *Agrobacterium radiobacter, Agrobacterium rhizogenes* and *Agrobacter tumefaciens*; the genus Alcaligenes and more particularly the species *Alcaligenes faecalis;* the genus Rhizobium; the genus Sclerotium and more particularly the species *Sclerotium rolfsii* and *Sclerotium glucanicum;* the genus Corticium: the genus Sclerotinia; and the genus Stromatinia.

A preferred biogum produced by fermentation by means of the aforesaid microorganisms is that gum produced by fermentation of the bacteria of the genus Xanthomonas.

It will of course be appreciated that it is also within the ambit of the present invention to use a mixture of different biogums as a stabilizing agent.

The stabilizing system of the invention further comprises a cationic surface active agent selected from among quaternary ammonium compounds and phosphonium and sulfonium compounds.

The quaternary ammonium compounds are advantageously those having the following formula (1):

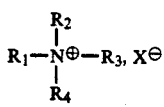
(1)

wherein X is an anion and $R_1$, $R_2$, $R_3$ and $R_4$, which may be identical or different, are each an alkyl, alkenyl, alkoxy, alkylphenyl or aryl radical; preferably, at least one of such radicals has a number of carbon atoms which is equal to or greater than 6.

It is also possible to use heterocyclic quaternary ammonium compounds, namely, those in which the nitrogen atom comprises a heterocycle which either may or may not be saturated. Exemplary of such heterocycles are those having the following formula (2):

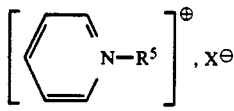
(2)

wherein X is an anion, and $R_5$ is an alkyl radical, preferably having more than 7 carbon atoms, and wherein the heterocycle may also be substituted.

The preferred quaternary ammonium compounds are ammonium acetate, sulfate or the halides (in particular the chloride or bromide).

Also preferred are the compounds of the following formula (3):

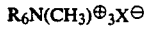
(3)

wherein $X = Cl$ or $Br$ and $R_6$ is an alkyl radical having at least 8 carbon atoms such as, for example, cetyl trimethyl ammonium bromide (CTAB), dodecyl trimethyl ammonium bromide and hexadecyl trimethyl ammonium chloride.

Exemplary heterocyclic compounds are cetyl pyridinium chloride or bromide.

Also in accordance with the present invention, a stabilizing system can be used further comprising aluminum or a compound of aluminum. In a preferred embodiment of the invention, the aluminum is used in the form of sodium aluminate or aluminum sulfate. However, any compound of aluminum can thus be used which performs the same function, without adversely affecting the properties of the silica such as, for example, aluminum chloride, acetate, phosphate or nitrate, or the alkali metal and alkaline earth metal aluminates.

The aluminum or aluminum compound may be introduced during the actual preparation of the silica, namely, during the precipitation operation or subsequently. It is preferable, however, for it to be added either to the abovementioned filter cake or at the instant of the slaking thereof.

The presence of the aluminum or compound of aluminum enables the production of suspensions of lower viscosity.

Finally, in combination with the aforementioned constituents of the stabilizing system, it is advantageous to include an antibacterial agent, for example of the formaldehyde, glutaraldehyde, sodium benzoate or sodium nitride type.

The amount of biogum advantageously ranges from 0.05% to 1% and more preferably from 0.1% to 0.5% by weight with respect to the amount of anhydrous silica. For the cationic surface active agent, such amount advantageously ranges from 0.05% to 0.5% by weight.

When incorporating aluminum or a compound of aluminum, the amount of aluminum, expressed in terms of the amount of aluminum per the amount of anhydrous silica, advantageously ranges from 500 to 10,000 ppm and more preferably from 1,000 to 6,000 ppm.

In another preferred embodiment of the invention, the silica of the suspension is subjected to a crushing operation. The silica is crushed, essentially to provide a finer particle size having a narrower granulometric distribution.

The crushing operation is carried out in such manner as to produce, for example, a silica which has a median diameter in respect of its particles ranging from 0.5 to 15 μm, more preferably from 1 to 5 μm (using a Coulter counter to determine the diameter).

It was found that the crushing operation makes it possible to enhance the stability of the slurry over time.

The particular method for preparing the suspension is not critical and generally comprises mixing a suspension of the silica with the surface active agent in a tank, with the aluminum or compound thereof. Next, the biogum is added in a second stage. Finally, if appropriate, the mixture thus produced is transported into a crusher.

The final pH of the suspension does not appear to be critical. In actual practice, it typically ranges from 5.5 to 8.5.

The proportion of dry solids is generally at least 5% and preferably greater than 25%. In accordance with the present invention, in practice it is possible to produce suspensions comprising at least 35% of silica.

The stable suspensions which are produced in the manner described immediately above may advantageously be used in the paper and cardboard industries, such as, for example, in the coating operation for the preparation of specialty papers, e.g., ink jet papers, thermal transfer papers, and low-weight papers.

It will be appreciated that the suspensions of the invention are suitable for all known applications of such types of products, such as, for example, as polishing compounds, additives for concrete and building materials, additives for paints, inks, glues, varnishes, and the like.

In order to further illustrate the present invention and the advantages thereof, the following specific examples are given, it being understood that same are intended only as illustrative and in nowise limitative.

EXAMPLE 1

The starting material was a precipitation silica in powder form having a BET surface area of 250 m²/g, a DOP oil absorption of 130 cm³/100 g and an ignition weight loss of 11% at 900° C.

90 g of such silica were dispersed in 142 g of water. Added to the dispersion were 5 g of CTAB, at a concentration of 2.5% and then 10 g of RHODOPOL 50 MC at a concentration of 2%. The suspension had an amount of dry solids of 34% and a pH of 7.2. The mean diameter of the particles in suspension was 20 μm.

After storage for 6 months, the sedimentary volume (volume of solid/total volume) was zero. Viscosity, as measured on a RHEOMAT 115 viscosimeter at 1,000 $s^{-1}$, was 130 mPa.s.

EXAMPLE 2

This example used a silica having the same characteristics as that used in Example 1, but in the form of a filter cake directly produced from the precipitation reaction. On the other hand, in preparation of that silica, aluminum was introduced in the form of sodium aluminate during the precipitation operation, in an amount of 5,000 ppm expressed in terms of aluminum with respect to the anhydrous silica.

To 600 g of that washed cake, comprising 37% of $SiO_2$, 117 g of CTAB at a concentration of 2.5% were added thereto, in a slaking device. After agitation for 15 minutes, 234 g of RHODOPOL 50 MC at a concentration of 2% were finally added.

The mixture which was transported by means of a pump was crushed using a DYNO apparatus such as to provide the desired granulometry.

This resulted in the production of a slurry with a pH of 6.8, comprising 36% of silica in the form of particles of a median diameter, as ascertained on a Coulter counter, of 2.9 μm.

After 60 days, the sedimentary volume was zero. The viscosity was 480 mPa.s as measured on a RHEOMAT 115 viscosimeter at 1 000 $s^{-1}$. The suspension was fluid and pumpable.

COMPARATIVE EXAMPLE 3

The starting material in this example was a filter cake of a silica which, once dried, had a BET surface area of 100 $m^2/g$, a DOP oil absorption of 120 $ml^3/100$ g and an ignition weight loss of 10% at 900° C.

227 g (100 g of $SiO_2$) of the resulting cake was then slaked, to which 48 g of water were added in an ULTRA-TURAX, and then 10 g of RHODOPOL 50 MC at a concentration of 2% was added. The final slurry had a pH of 7.5, and a silica content of 35%.

After 8 days, the formation of a hard sediment was observed. The sedimentary volume was 80%.

COMPARATIVE EXAMPLE 4

The starting material was the same silica cake as that used in Example 3.

253 g of the cake (100 g of $SiO_2$) were slaked in an ULTRA-TURAX and 10 g of water and 8 g of a 2.5% solution of CTAB were added thereto. Agitation was maintained until total homogenization was achieved. The resulting suspension had a pH of 6.8, with a silica content of 37%.

After 1 month, the viscosity of the mixture was very high, 2,200 mPa.s as measured using a RHEOMAT 115 viscosimeter at 1,000 $s^{-1}$. This rendered the suspension nonpumpable.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims, including equivalents thereof.

What is claimed is:

1. A stable aqueous suspension of silica particulates, comprising a suspension, in water, of precipitated silica particulates, and, and as stabilizing agent therefor, an effective stabilizing amount of at least one biogum heteropolysaccharide and at least one cationic surface active agent comprising a quaternary ammonium, sulfonium or phosphonium compound.

2. The stable suspension as defined by claim 1, said precipitated silica particulates from a slaked filter cake.

3. The stable suspension as defined by claim 1, said biogum heteropolysaccharide having been produced via fermentation of a carbohydrate by bacteria or fungi of the genera Xanthomonas, Arthrobacter, Azotobacter, Agrobacter, Alcaligenes, Erwinia, Rhizobium, Corticium, Scherotinia, Stromatinia or Sclerotium.

4. The stable suspension as defined by claim 3, said biogum heteropolysaccharide comprising a xanthan gum.

5. The stable suspension as defined by claim 1, comprising an ammonium acetate, sulfate or halide.

6. The stable suspension as defined by claim 1, comprising a heterocyclic quaternary ammonium compound.

7. The stable suspension as defined by claim 1, comprising a quaternary ammonium compound of the formula $RN(CH_3)_3^{\oplus} X^{\ominus}$, in which X is chlorine or bromine and R is an alkyl radical having at least 8 carbon atoms.

8. The stable suspension as defined by claim 7, said at least one quaternary ammonium surfactant comprising cetyl trimethyl ammonium bromide, dodecyl trimethyl ammonium bromide or hexadecyl trimethyl ammonium chloride.

9. The stable suspension as defined by claim 1, further comprising a viscosity diminishing amount of aluminum or a compound of aluminum.

10. The stable suspension as defined by claim 9, comprising from 500 to 10,000 ppm of aluminum values.

11. The stable suspension as defined by claim 9, comprising from 1,000 to 6,000 ppm of aluminum values.

12. The stable suspension as defined by claim 9, comprising aluminum sulfate, halide, acetate, phosphate or nitrate, or an alkali or alkaline earth metal aluminate.

13. The stable suspension as defined by claim 1, having a dry solids content of at least 15% by weight.

14. The stable suspension as defined by claim 13, having a dry solids content of at least 25% by weight.

15. The stable suspension as defined by claim 13, having a dry solids content of at least 35% by weight.

16. The stable suspension as defined by claim 1, having a pH ranging from 5.5 to 8.5.

17. The stable suspension as defined by claim 1, said silica particulates having a median particle diameter size ranging from 0.5 to 15 μm.

18. The stable suspension as defined by claim 1, said silica particulates having a median particle diameter size ranging from 1 to 5 μm.

19. The stable suspension as defined by claim 1, comprising from 0.05% to 1% by weight of said at least one biogum heteropolysaccharide, relative to the weight of said silica particulates.

20. The stable suspension as defined by claim 19, comprising from 0.05% to 0.5% by weight of said at least one quaternary ammonium, sulfonium or phosphonium compound.

21. The stable suspension as defined by claim 1, comprising from 0.01% to 0.5% by weight of said at least one biogum heteropolysaccharide, relative to the weight of said silica particulates.

22. The stable suspension as defined by claim 1, further comprising an antibacterial agent.

23. The stable suspension as defined by claim 1, said silica particulates having a BET surface area ranging from 2 to 400 m$^2$/g, and an oil absorption ranging from 50 to 400 cm$^3$/g.

24. The stable suspension as defined by claim 1, comprising at least one quaternary ammonium surfactant.

25. The stable suspension as defined by claim 24, said at least one quaternary ammonium surfactant having the formula (1):

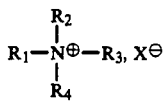  (1)

wherein X is an anion and $R_1$, $R_2$, $R_3$ and $R_4$, which may be identical or different, are each an alkyl, alkenyl, alkoxy, alkylphenyl or aryl radical.

26. The stable suspension as defined by claim 24, said at least one quaternary ammonium surfactant having the formula (2):

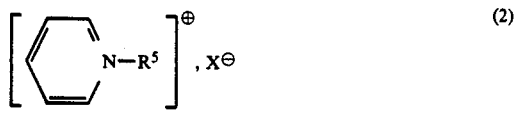

wherein X is an anion and $R_5$ is an alkyl radical.

27. The stable suspension as defined by claim 24, said at least one quaternary ammonium surfactant comprising cetyl pyridinium chloride or cetyl pyridinium bromide.

28. The stable suspension as defined by claim 1, comprising at least one sulfonium surfactant.

29. The stable suspension as defined by claim 1, comprising at least one phosphonium surfactant.

30. A stable aqueous suspension of silica particulates, comprising a suspension, in water, of silica particulates produced by a reaction of silicate with acid, and, and as a stabilizing agent therefor, an effective stabilizing amount of at least one biogum heteropolysaccharide and at least one cationic surface active agent comprising a quaternary ammonium, sulfonium or phosphonium compound.

* * * * *